United States Patent Office 3,545,061
Patented Dec. 8, 1970

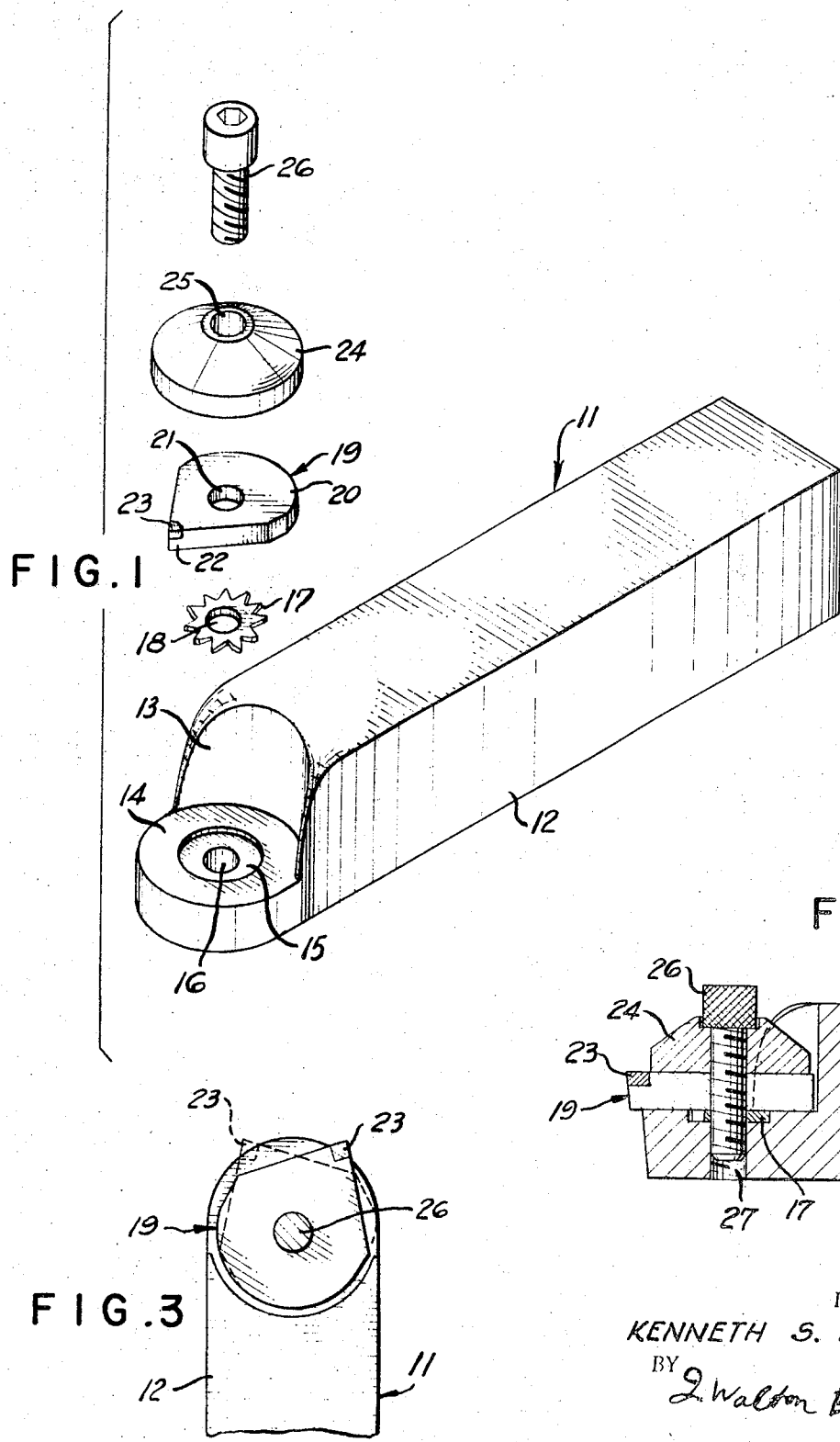

3,545,061
CUTTING TOOL
Kenneth S. Michael, 62 Madison St.,
Hackensack, N.J. 07601
Filed May 21, 1968, Ser. No. 730,725
Int. Cl. B26d *1/00*
U.S. Cl. 29—98                                1 Claim

ABSTRACT OF THE DISCLOSURE

A cutting tool is shown having a support provided with a cut-out portion at one end and an adjacent projecting shelf portion. An opening is provided within the shelf portion. The opening is countersunk to receive a lock washer. A cutter having a projecting point of abrasive material is rotatably disposed within the support. The cutter is formed with an opening mating with the opening within the support. A holding member is also provided with an opening mating with the other openings and a screw passes through all openings and is adapted to lock the cutter in fixed positions upon the support.

---

This invention relates to a cutting tool having an abrasive portion thereupon which is preferably an industrial diamond.

Generally industrial diamond tips, which are relatively expensive, must be replaced after wear. In conventional cutting tools of this type the diamond portion is made integral with the remainder of the tool. Hence, when the tool is worn, the entire structure must be replaced at a relatively high cost.

In the tool of this invention the cutting portion thereof is made separable from the remainer of the tool. Hence replacement of the cutting portion thereof after wear is simple and rapid.

Furthermore, in tools of this type, adjustment of the cutting portion is difficult. The tool of this invention includes very simple adjustment means which permit a rotatable adjustment of the cutting portion and fixed positioning of the cutting portion at the point desired.

In addition the cutting tool of this invention is relatively simple to manufacture and foolproof in operation.

The above constitutes a brief description of this invention and some of the objects and advantages thereof. Other objects and advantages of this invention will become apparent to the reader of this specification as the description proceeds.

The invention will now be described by reference to the accompanying drawings which are made a part of this specification.

FIG. 1 is an exploded view of the cutting tool of this invention.

FIG. 2 is a fragmentary cross-sectional view of the cutting tool of this invention is assembled condition with the cutting portion thereof in a fixed position with respect to the remainder of the tool.

FIG. 3 is a side elevational view of the cutting tool of this invention with an alternative position of the cutter member thereof shown in phantom lines.

The invention will now be further described by reference to the specific form thereof as shown in the accompanying drawings. In this connection however, the reader is cautioned to note that the specific form of this invention as set forth in the specification herein is for illustrative purposes and for purposes of example only. Various changes and modifications could obviously be made within the spirit and scope of this invention.

Turning now to the specific embodiment of this invention as shown in the drawings herein the cutting tool 11 of this invention is formed with a support member 12 which is provided with an arcuate cut-out portion 13. Adjacent the cut-out portion is a shelf portion 14 which is provided with a countersunk portion 15 and a hole 16. A lock washer 17 provided with a hole 18 is disposed within countersunk porton 15.

A cutter member 19 is formed with a body 20 having an arcuate rear portion which also carries a point portion 22. Within point portion 22 is an abrasive cutter 23 which is preferably an industrial diamond. The arcuate rear portion of body 20 is also adapted to fit within cut-out portion 13 and substantially conforms in curvature to the curvature of portion 13. Body 20 bears an opening 21 therethrough.

A holding member 24 having an inwardly tapered upper portion and a substantially flat base normally overlies body 20 and is formed with an opening 25 therewithin. A screw 26 passes through openings 25, 21, 18 and 16 and is secured within a threaded portion 27 which is disposed within shelf portion 14.

With the foregoing specific description the operation of this invention will now be explained.

Screw 26 is loosely connected to members 24, 19 and 12. Cutter 19 is rotated to the position to produce the proper angle of cut desired. Screw 26 is then locked in position so that the parts are not capable of any further rotational movement. The fixed position of the cutter in selective points is produced by the structure described above. Cutter 11 is then placed within the appropriate holding support and caused to bear against the work involved. Cutting is then performed as desired.

If abrasive portion 23 wears it is sometimes possible to continue to utilize the cutter of this invention by slightly changing the position of member 19 so as to expose a slightly different portion of element 23. This position change is made possible because of the specific structure provided in this invention which rigidly positions the cutter member during its use.

The foregoing sets forth the manner in which the objects of this invention are achieved.

I claim:

1. A cutting tool comprising, in combination, a support provided with a cut-out element at the front thereof having an arcuate rear portion, an arcuate shelf portion projecting forwardly from said support at least partially within said cut-out portion, said shelf portion provided with a substantially centrally located opening and a countersunk portion adjacent said opening; a lock washer disposed within said countersunk portion provided with an opening in registration with the opening within the shelf portion, a cutter member having an arcuate rear portion of substantially the same arcuate configuration as the rear portion of said cut-out element and also formed with a point portion at the front thereof and provided with an opening in registration with the previously mentioned openings, said cutter member also having an abrasive element within said point portion adapted to produce a cutting force upon an impinging object; a holding member having an inwardly tapering upper portion, a substantially flat base and provided with an optning therewithin in registration with the previously mentioned openings overlying said cutter member, and a screw secured within all of the previously mentioned openings and adapted to selectively lock said cutter member into a plurality of fixed positions so that said cutter member can be utilized in another position after the first position utilized has produced normally unacceptable cutter wear.

References Cited

UNITED STATES PATENTS

| | | | |
|---|---|---|---|
| 1,104,980 | 7/1914 | Fry | 20—96 |
| 1,282,984 | 10/1918 | Thompson | 29—98 |
| 2,289,344 | 7/1942 | Cedarleaf | 29—98 |
| 2,808,638 | 10/1957 | Filippi | 29—96 |
| 3,128,535 | 4/1964 | Anania | 29—98 |
| 3,299,491 | 1/1967 | Hall | 29—96 |

FOREIGN PATENTS 563,181  5/1957  Italy.

HARRISON L. HINSON, Primary Examiner